US008811500B2

(12) United States Patent
Smith et al.

(10) Patent No.: US 8,811,500 B2
(45) Date of Patent: Aug. 19, 2014

(54) DATA TRANSMISSION

(75) Inventors: Timothy Condren Smith, Cambridge (GB); Peter William Stephenson, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 501 days.

(21) Appl. No.: 12/865,848

(22) PCT Filed: Jan. 23, 2009

(86) PCT No.: PCT/EP2009/050789
§ 371 (c)(1),
(2), (4) Date: Aug. 24, 2010

(87) PCT Pub. No.: WO2009/106395
PCT Pub. Date: Sep. 3, 2009

(65) Prior Publication Data
US 2011/0002402 A1 Jan. 6, 2011

(30) Foreign Application Priority Data

Feb. 25, 2008 (GB) .................................. 0803387.0

(51) Int. Cl.
*H04L 27/00* (2006.01)
*H04L 1/00* (2006.01)
*H04L 1/16* (2006.01)

(52) U.S. Cl.
CPC ............... *H04L 1/001* (2013.01); *H04L 1/0075* (2013.01); *H04L 1/0004* (2013.01); *H04L 1/0073* (2013.01); *H04L 1/1692* (2013.01)
USPC ............ 375/259; 375/219; 375/295; 375/316

(58) Field of Classification Search
CPC .... H04B 1/40; H04L 1/0071; H04L 27/2647; H04L 1/0003; H04L 25/4902
USPC .......................... 375/259, 335, 295, 316, 219
See application file for complete search history.

(56) References Cited

U.S. PATENT DOCUMENTS 6,693,907 B1    2/2004    Wesley et al.

(Continued)

FOREIGN PATENT DOCUMENTS

| EP | 1 050 977 A2 | 11/2000 |
| GB | 2 433 383 A | 6/2007 |
| WO | 01/22645 A | 3/2001 |
| WO | 03/034611 A2 | 4/2003 |

(Continued)

*Primary Examiner* — Ted Wang
(74) *Attorney, Agent, or Firm* — Vorys, Sater, Seymour and Pease LLP; Vincent M DeLuca

(57) ABSTRACT

A system for transmitting data between a first device and a second device, the first device being arranged to transmit data to the second device and the second device being arranged to transmit an acknowledgement to the first device if the data transmitted by the first device is properly received by the second device; wherein the system comprises means to measure the quality of reception of acknowledgements by the first device and to modify one or more acknowledgement transmission parameters depending on the measurement. The parameters may include: transmission rate, degree of forward error correction coding, and output power. The parameters may be modified to improve the quality of reception of acknowledgements if the measured quality falls below a threshold. The means to measure the quality of reception may comprise means to determine a measure of the number, or relative number, of acknowledgements that were not properly received by the first device. In an embodiment the first device is arranged to retransmit the data if an acknowledgement is not properly received, and the means to determine a measure of the number of acknowledgements that were not properly received by the first device comprises means to determine the number of data packets that have been received by the second device which were previously properly received by the second device.

12 Claims, 3 Drawing Sheets

(56) References Cited

U.S. PATENT DOCUMENTS

| | | |
|---|---|---|
| 2002/0049068 A1* | 4/2002 | Koo et al. .................... 455/522 |
| 2003/0039217 A1* | 2/2003 | Seo et al. ..................... 370/318 |
| 2003/0108013 A1* | 6/2003 | Hwang et al. ................ 370/335 |
| 2006/0034226 A1 | 2/2006 | Gu et al. |
| 2006/0062167 A1* | 3/2006 | Golitschek et al. .......... 370/293 |
| 2007/0041349 A1 | 2/2007 | Kim et al. |

FOREIGN PATENT DOCUMENTS

| | | |
|---|---|---|
| WO | 2004/002049 A1 | 12/2003 |
| WO | 2004/006491 A1 | 1/2004 |
| WO | 2006/108915 A1 | 10/2006 |
| WO | 2007-095967 A | 8/2007 |

* cited by examiner

DATA TRANSMISSION

The present invention relates to systems and methods for transmission of data in which an acknowledgement mechanism is used to acknowledge proper receipt of transmitted data.

In systems in which data is transmitted between devices, for example in wired or wireless networks, radio systems and the like, the data may not always be reliably or properly received. For example, data packets may become lost in a network, or noise on a transmission channel may result in data becoming corrupted. For this reason, many systems employ an acknowledgement mechanism to improve the reliability of data transmission. Many existing communication protocols, such as Bluetooth include an acknowledgement mechanism.

In a typical acknowledgement mechanism, a first device transmits a portion of data in the form of a data packet over a data communication channel. When a second device correctly receives the data packet, the second device transmits an acknowledgement signal back to the first device over an acknowledgement channel to acknowledge proper receipt of the data. In some mechanisms, the first device may only transmit the next data packet when an acknowledgement has been received. If an acknowledgement has not been received by the first device, for example within a predetermined period of time, then the first device retransmits the data packet on the assumption that the second device did not properly receive the data packet.

Using the mechanism described above, an acknowledgement from the second device may not be received by the first device for several reasons. First, if the data packet became lost during transmission and so was never received by the second device, then the second device would not generate an acknowledgement as no data is received. Second, if the data packet was received by the second device, but contained errors or was otherwise corrupted, for example due to noise on the data channel, the second device may require the data packet to be retransmitted. In this case, the second device would not transmit an acknowledgement causing the first device to retransmit the data packet. Third, if the data packet was properly received by the second device with no errors then the second device transmits an acknowledgement. However, the acknowledgement itself may become lost or corrupted over the acknowledgement channel so that it may not be properly received by the first device.

In this last case, the first device would retransmit the data, having not received an acknowledgement, even though it is not necessary, since the second device properly received the data packet. Therefore, in conventional mechanisms such as the one described above, unnecessary retransmissions of data can occur, reducing overall throughput.

The present invention solves this problem by reducing the number of unnecessary data retransmissions.

According to a first aspect of the present invention there is provided a system for transmitting data between a first device and a second device, the first device being arranged to transmit data to the second device and the second device being arranged to transmit an acknowledgement to the first device if the data transmitted by the first device is properly received by the second device; wherein the system comprises means to measure the quality of reception of acknowledgements by the first device and to modify one or more acknowledgement transmission parameters depending on the measurement.

According to a second aspect of the present invention there is provided a receiver for receiving data from a transmitter, the receiver being arranged to transmit an acknowledgement to the transmitter if data is properly received by the receiver; wherein the receiver comprises a circuit arranged to measure the quality of reception of acknowledgements by the transmitter and to modify one or more acknowledgement transmission parameters depending on the measurement.

According to a third aspect of the present invention there is provided a method for transmitting data between a first device and a second device, the method comprising the steps of: the first device transmitting data to the second device; and the second device transmitting an acknowledgement to the first device if the data transmitted by the first device is properly received by the second device; wherein the method comprises the further steps of: measuring the quality of reception of acknowledgements by the first device; and modifying one or more acknowledgement transmission parameters depending on the measurement.

According to a fourth aspect of the present invention, there is provided a method for receiving data comprising the steps of: receiving data transmitted by a transmitter; and transmitting an acknowledgement if the data is properly received; wherein the method comprises the further steps of: measuring the quality of reception of acknowledgements by the transmitter; and modifying one or more acknowledgement transmission parameters depending on the measurement.

By measuring the quality of reception of acknowledgements by the transmitter and modifying one or more acknowledgement transmission parameters depending on the measurement, unnecessary data retransmissions are minimised. For example, when quality of reception of acknowledgements is relatively low, acknowledgement transmission parameters may be modified to make the acknowledgement mechanism more robust, thereby increasing reliability. By improving the reliability of the acknowledgement mechanism in conditions where the quality of reception of acknowledgements is low, unnecessary retransmission of data is avoided. When quality of reception of acknowledgements is relatively high, acknowledgement transmission parameters may be modified to improve various aspects of the system at the expense of a less robust acknowledgement mechanism. In this way, an optimal balance between acknowledgement reliability and other aspects of system performance can be achieved.

The present invention will now be described in greater detail, with reference to the figures, in which.

Figure 1:
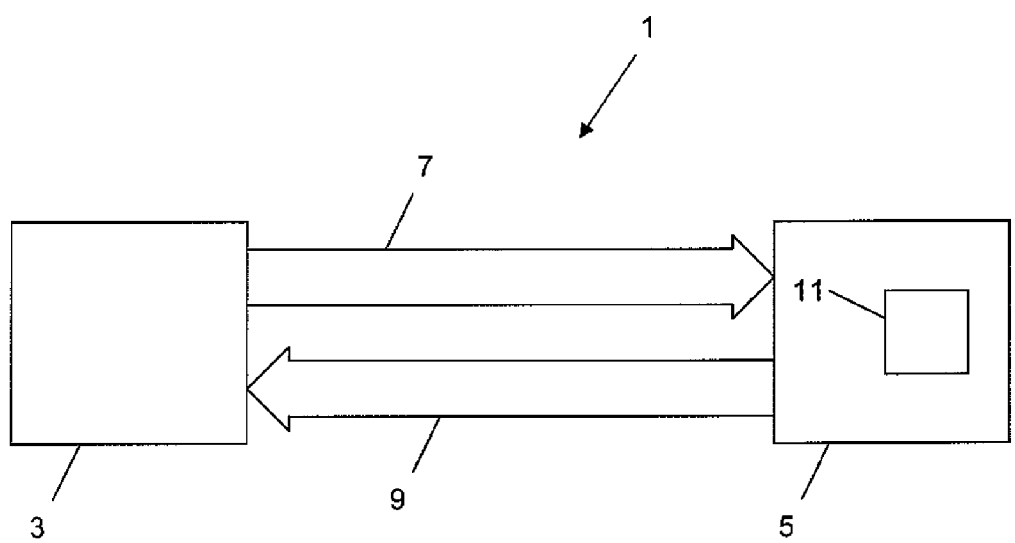
FIG. 1 is a schematic diagram of a system according to the present invention.

FIG. 1 illustrates an exemplary embodiment of the present invention. In the system 1 shown, a first device 3 transmits data to a second device 5 via a data communication channel 7. The channel 7 may be any suitable type of communication channel including wired and wireless channels, and the first device 3 and second device 5 may be any suitable device capable of communicating over the channel 7. In one embodiment, the first device 3 and second device 5 are radio devices and channel 7 is a radio link operating according to a digital radio protocol. One example of a digital radio protocol is Bluetooth. In one embodiment, the first device 3 and the second device 5 each comprise a transceiver and are capable of two way communication. In another embodiment, only one way communication may be possible.

The data transmitted between the first device 3 and the second device 5 over channel 7 is in the form of one or more data packets, each data packet comprising a header and payload data. When the second device 5 properly receives a data packet, the second device 5 generates and transmits an acknowledgement signal back to the first device 3 over an acknowledgement communication channel 9. The acknowledgement communication channel 9 and data communication channel 7 may share a single channel, or may be separate channels. The header of each data packet comprises a unique code, such as a number, identifying the data packet. When the second device 5 acknowledges receipt of a data packet, the acknowledgement signal transmitted to the first device 3 comprises the unique code of that data packet. The acknowledgement informs the first device 3 that the data packet was properly received by the second device 5. In cases when the first device 3 has transmitted a data packet and not received an acknowledgement from the second device 5, the first device 3 assumes that the data packet was not properly received by the second device 5 and so retransmits the data packet. For example, the first device 3 may retransmit the data if an acknowledgement is not received within a predetermined period of time.

Any suitable set of conditions may be applied to determine whether a data packet is considered to have been properly received by the second device 5. For example, the data packet may be considered to be properly received if the payload data in the data packet is received without errors, or if the number of errors is below a threshold. Errors may be caused for example by noise occurring on the data channel 7. Upon receipt of a data packet, the second device 5 checks the payload data for errors using any suitable technique. For example, forward error correction (FEC) coding may be used. Additional or alternative conditions may need to be satisfied for a data packet to be considered properly received.

In some situations, when a data packet has been properly received by the second device 5 and an acknowledgement has been transmitted, the first device 3 may not actually properly receive the acknowledgement. For example, the acknowledgement may be lost over the acknowledgement channel 9, or noise on channel 9 may cause the acknowledgement to have errors or become otherwise corrupted. In this case, even though a data packet was properly received by the second device 5, the first device 3 still retransmits the data packet. This may result in the second device 5 receiving the same data packet two or more times, unnecessarily reducing overall throughput of the data channel.

In order to improve the reliability of transmission of acknowledgements between the second device 5 and the first device 3, the quality of reception of acknowledgements by the first device 3 is measured by the second device 5. One or more acknowledgement transmission parameters in the second device 5 are then modified according to the measurement. For example, if the quality of reception is determined to be relatively low then this means that a significant proportion of acknowledgements are not being properly received by the first device 3. In this case, one or more acknowledgement transmission parameters are modified to improve the reliability and robustness of the acknowledgement mechanism so minimise the number of lost or improperly received acknowledgements.

For example, the transmission rate used for acknowledgements may be reduced, the degree of forward error correction coding in the acknowledgements may be increased and/or the acknowledgement signal output power may be increased. Performing one or more of these modifications increases the chance of an acknowledgement being properly received by the first device 3. Any combination of these and any other suitable parameters may be modified to improve the reliability and robustness of the acknowledgement mechanism, thereby reducing the number of lost or improperly received acknowledgements.

In one embodiment, one or more parameters are modified in this way if the measured quality of reception falls below a threshold, which may be predetermined or dynamically set.

If the quality of reception is determined to be relatively high, then this means that most or all acknowledgements are being properly received by the first device 3. In this case, it may be acceptable to reduce the robustness of the acknowledgement mechanism in order to improve other aspects of system performance. One or more acknowledgement transmission parameters may be modified to improve aspects of system performance, possibly at the expense of an acceptable reduction in reliability and robustness of the acknowledgement mechanism.

For example, the transmission rate used for acknowledgements may be increased, the degree of forward error correction coding in the acknowledgements may be reduced and/or the acknowledgement signal output power may be decreased. Increasing the transmission rate increases the speed of transmission, reducing the degree of forward error correction requires less error coding data to be transmitted and simplifies error correction, while reducing the output power saves overall power. Any combination of these and any other suitable parameters may be modified to improve aspects of system performance other than the acknowledgement mechanism.

In one embodiment, one or more parameters are modified in this way if the measured quality of reception falls above a threshold, which may be predetermined or dynamically set.

In a preferred embodiment, varying the transmission rate is the primary means of accommodating changes in acknowledgement reception quality. However, in other embodiments, particularly ones in which the data channel 7 is not based on an IEEE 802.11 communication protocol, one or more of the other parameters mentioned above may be used as the primary means of accommodating changes in acknowledgement reception quality. When acknowledgement transmission parameters are modified, it may be important to modify the parameters within the restrictions applying to the data transfer protocol being used.

The second device 5 is provided with a circuit 11 arranged to measure the quality of reception of acknowledgements by the first device 3. The measurement may be based on the number of acknowledgements not properly received by the first device 3. For example, the number of acknowledgements not properly received by the first device 3 as a proportion of the total number of acknowledgements transmitted by the second device 5 provides a measurement of the success rate of acknowledgement transmissions. Each time an acknowledgement is not properly received by first device 3 causes the first device to retransmit a data packet that has already been properly received by the second device 5. Therefore, each time the second device 5 receives a data packet which is the same as a data packet previously properly received, this indicates that an acknowledgement was not properly received by the first device 3. A data packet properly received for the first time may be referred to as an original packet, whereas a received data packet which has already been properly received may be referred to as a repeat packet.

The circuit 11 is arranged to determine the number $N_1$ of repeat packets, thereby providing a measure of the number of acknowledgements not properly received by the first device. The circuit 11 comprises a first counter which maintains a count of the number of repeat packets. The first counter is initially set to zero and each time a repeat packet is received the first counter is incremented by one. The circuit 11 may determine that a received data packet is a repeat packet using any suitable technique. For example, the circuit 11 may maintain a list of the codes of those data packets which have been previously properly received. The code of a received data packet is compared to the list, and if a match is found then it is determined that that data packet is a repeat packet.

The circuit 11 also comprises a second counter which maintains a count of the total number $N_2$ of acknowledgements transmitted by the second device 5. The second counter is initially set to zero and each time the second device 5 transmits an acknowledgement the second counter is incremented by one. The circuit 11 is arranged to divide $N_1$ by $N_2$ to determine the number of acknowledgements not properly received by the first device 3 as a proportion of the total number of acknowledgements transmitted by the second device 5. This provides one possible measure of the quality of reception of acknowledgements by the first device 3, although other measures are possible.

The process described above may be carried out over a specified interval, for example, over a specified time period, over a specified number of data packets received by the second device 5 or over a specified number of acknowledgements transmitted by the second device 5. The value of $N_1$ divided by $N_2$ calculated at the end of the interval then provides a measure of the quality of reception of acknowledgements by the first device over the interval. Following the interval, the first counter and second counter are reset and the process is repeated for the next interval.

Alternatively, the value of $N_1$ divided by $N_2$ may be continuously or periodically calculated based on a specified interval (for example time period, number of data packets received, or number of acknowledgements transmitted) immediately preceding the present moment. In this way a measurement of the quality of reception of acknowledgements by the first device 3 is continuously updated based on a history of recent acknowledgements.

Figure 2:
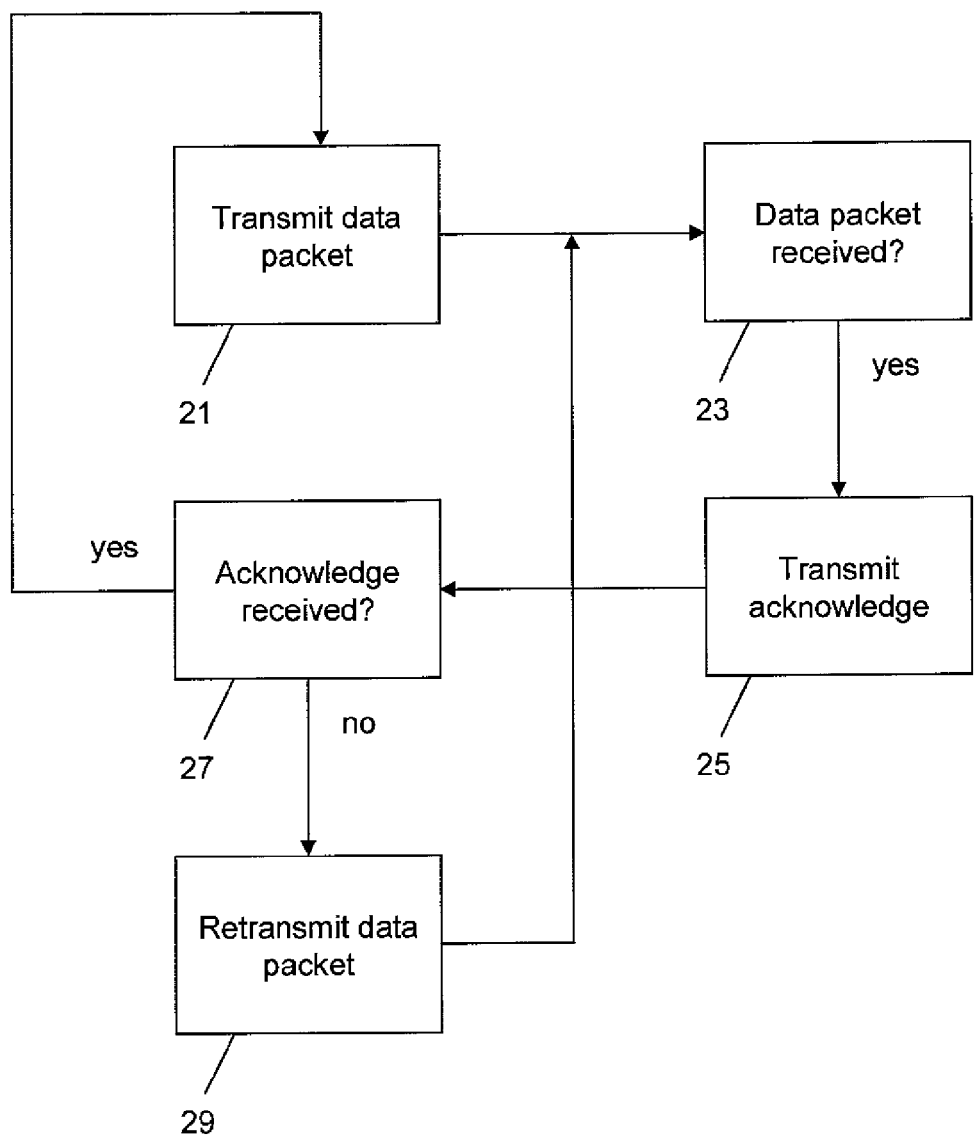
FIG. 2 is a flow diagram of the processes carried out by the system shown in FIG. 1 to carry out an acknowledgement mechanism.

FIG. 2 is a flow diagram of the processes carried out by the system shown in FIG. 1 to carry out an acknowledgement mechanism.

In a first step 21, the first device 3 transmits a data packet to the second device 5. In a next step 23, the second device 5 determines whether a data packet has been properly received. If a data packet has been properly received then in a next step 25, the second device 5 transmits an acknowledgement to the first device 3. If the second device 5 does not properly receive a data packet, no acknowledgement is transmitted. In a next step 27, the first device 3 determines whether an acknowledgement has been received for the transmitted data packet. If an acknowledgement has been received then the above process is repeated from step 21 for the next data packet. If an acknowledgement has not been received then in a next step 29, the first device 3 retransmits the data packet. The above process is then repeated from step 23.

Figure 3:
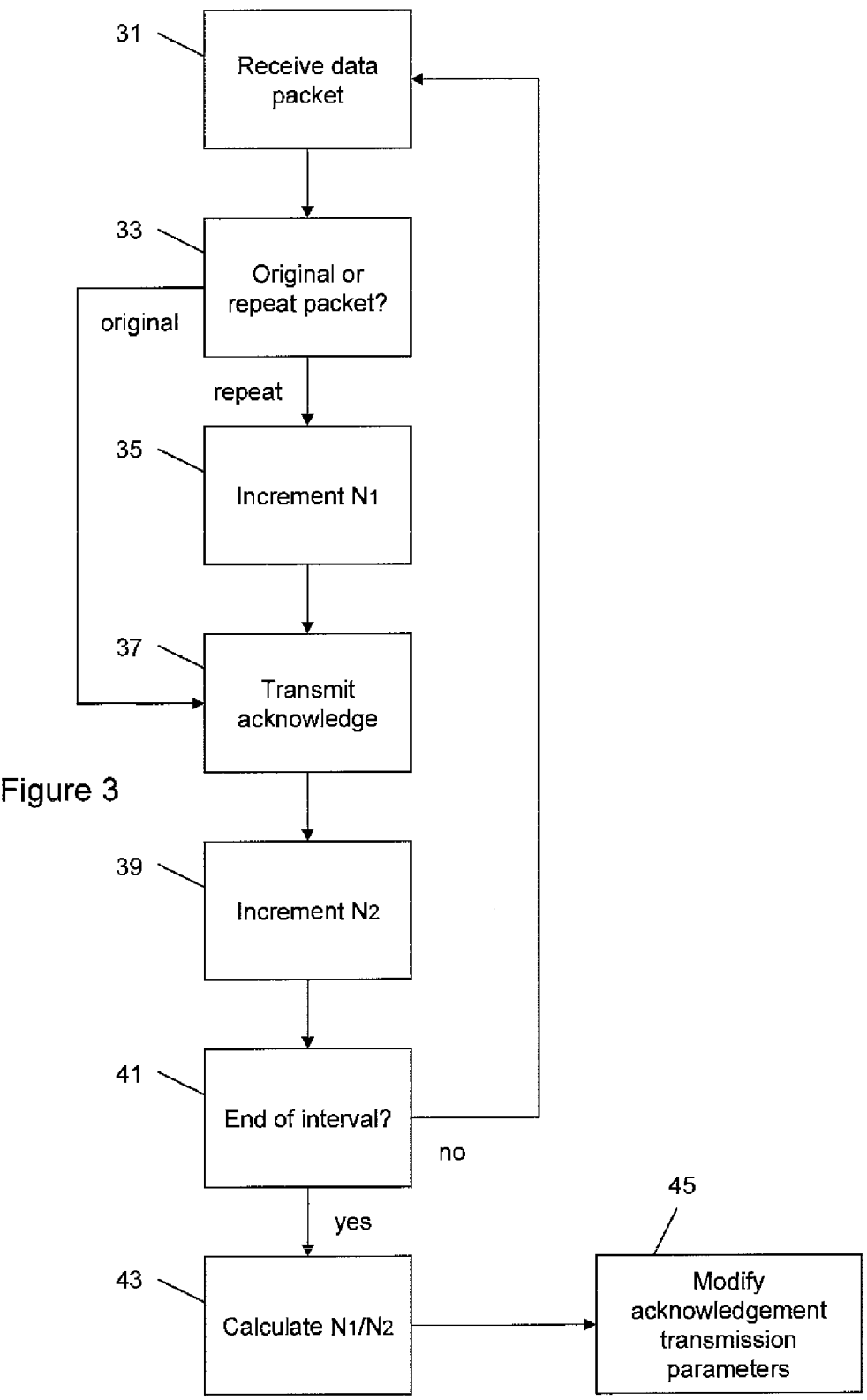
FIG. 3 is a flow diagram of additional processes carried out by the system shown in FIG. 1 to carry out a method according to the present invention.

FIG. 3 is a flow diagram of additional processes carried out by the system shown in FIG. 1 to carry out a method according to the present invention.

In a first step 31, the second device receives a data packet. In a next step 33, the second device 5 determines whether the data packet is an original packet or repeat packet. If the data packet is determined to be a repeat packet, in a next step 35, the value of $N_1$ maintained by the first counter is incremented by one. In a next step 37, the second device 5 transmits an acknowledgement that the data packet has been properly received. If in step 33 the second device determines that the received data packet is an original packet, step 35 is bypassed and the process proceeds directly to step 37 where an acknowledgement is transmitted. After an acknowledgement has been transmitted, in step 39, the value of $N_2$ maintained by the second counter is incremented by one. In a next step 41, it is determined whether or not the end of the current interval has been reached. If so, in a next step 43, the value of $N_1$ divided by $N_2$ is calculated to provide a measure of the quality of reception of acknowledgements by the first device 3. If not, then the process is repeated from step 31 for the next data packet. In a next step 45, one or more acknowledgement transmission parameters are modified according to the measure as described in greater detail above.

In the embodiments described above, the measured quality of reception of acknowledgements is based on data packets transmitted between a first device 3 and a second device 5 only. However, in other embodiments, the measurement may be based on data packets transmitted between greater numbers of devices. In all embodiments, the calculations used to make the measurement may be performed in any one of the devices involved in data transfer, or in a dedicated device, using information received from individual devices. The measurement may then be used to transmit commands to one or more of the devices which transmit acknowledgements causing the acknowledge transmission parameters in those devices to be modified according to the measurement. The acknowledge transmission parameters of different devices may be modified differently.

The invention claimed is:

1. A receiver for receiving data from a transmitter, the receiver being arranged to receive a data packet transmitted from the transmitter, and to transmit an acknowledgement to the transmitter if the transmitted data packet is properly received by the receiver, the acknowledgement being transmitted by using one or more acknowledgement transmission parameters;

the receiver including a circuit arranged to measure the quality of reception by the transmitter of acknowledgements of receipt of data packets, said acknowledgements having been sent from the receiver to the transmitter, to modify the one or more acknowledgement transmission parameters depending on the measurement of the quality of reception of the acknowledgements, and to transmit further acknowledgements by using the modified acknowledgement transmission parameters.

2. A receiver according to claim 1 in which the one or more acknowledgement transmission parameters includes at least one of: transmission rate, degree of forward error correction coding, and output power.

3. A receiver according to claim 1 in which the one or more acknowledgement transmission parameters are modified to improve the quality of reception of acknowledgements if the measured quality of reception falls below a first threshold.

4. A receiver according to claim 1 in which the one or more acknowledgement transmission parameters are modified if the measured quality of reception falls above a second threshold.

5. A receiver according to claim 1 in which the circuit is arranged to determine a measure of the number, or relative number, of acknowledgements that were not properly received by the transmitter.

6. A receiver according to claim 1 in which the measure of the quality of reception is based on transmissions over a specified interval.

7. A system comprising the receiver according to claim 1 and said transmitter, wherein said transmitter is arranged to transmit said data to the receiver.

8. A system according to claim 7 in which the circuit comprised in the receiver is arranged to determine a measure of the number, or relative number, of acknowledgements that were not properly received by the transmitter.

9. A system according to claim 8 in which the transmitter is arranged to retransmit the data if an acknowledgement is not properly received, and in which the circuit comprised in the receiver is arranged to determine the number of data packets that have been received by the receiver which were previously properly received by the receiver.

10. A system according to claim 9 in which the circuit comprised in the receiver is arranged to determine the total number of acknowledgements transmitted by the receiver.

11. A system according to claim 10 in which the circuit comprised in the receiver is arranged to determine the proportion of acknowledgements transmitted by the receiver that were not properly received by the transmitter.

12. A method comprising the steps of:
- receiving a data packet at a receiver, said data packet transmitted by a transmitter;
- transmitting an acknowledgement from the receiver to the transmitter if the data packet is properly received, the acknowledgement being transmitted by using one or more acknowledgement transmission parameters;
- measuring the quality of reception of acknowledgements received by the transmitter as transmitted in response to proper reception of data packets, said measuring being performed at the receiver;
- modifying the one or more acknowledgement transmission parameters used to transmit acknowledgements depending on the measurement of the quality of reception of acknowledgements; and
- transmitting further acknowledgements by using the modified acknowledgement transmission parameters.

\* \* \* \* \*